US011919391B2

(12) United States Patent
Yamada

(10) Patent No.: US 11,919,391 B2
(45) Date of Patent: Mar. 5, 2024

(54) ON-VEHICLE DISPLAY APPARATUS

(71) Applicant: YAZAKI CORPORATION, Tokyo (JP)

(72) Inventor: Yoshihisa Yamada, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 422 days.

(21) Appl. No.: 17/331,325

(22) Filed: May 26, 2021

(65) Prior Publication Data

US 2021/0370775 A1 Dec. 2, 2021

(30) Foreign Application Priority Data

May 29, 2020 (JP) ................... 2020-094300
Apr. 5, 2021 (JP) ................... 2021-064414

(51) Int. Cl.
*B60K 35/00* (2006.01)

(52) U.S. Cl.
CPC ........ *B60K 35/00* (2013.01); *B60K 2370/182* (2019.05); *B60K 2370/23* (2019.05); *B60K 2370/31* (2019.05); *B60K 2370/334* (2019.05); *B60K 2370/67* (2019.05)

(58) Field of Classification Search
CPC ............ B60K 35/00; B60K 2370/31; B60K 2370/67; B60K 2370/182; B60K 2370/23; B60K 2370/334
See application file for complete search history.

(56) References Cited

U.S. PATENT DOCUMENTS

| 7,180,408 | B2 * | 2/2007 | Sonobe | B60K 37/02 340/459 |
| 10,800,328 | B2 * | 10/2020 | Takazawa | B60K 37/00 |
| 10,852,818 | B2 * | 12/2020 | Saisho | B60R 1/00 |
| 11,077,753 | B2 * | 8/2021 | Nishizaki | G09G 3/002 |
| 2008/0249682 | A1 | 10/2008 | Wisniewski et al. | |
| 2011/0175798 | A1 * | 7/2011 | Sato | G02B 27/0101 345/7 |

(Continued)

FOREIGN PATENT DOCUMENTS

| CN | 207440417 U | 6/2018 |
| CN | 109416471 A | 3/2019 |
| CN | 210488125 U | 5/2020 |

(Continued)

*Primary Examiner* — Gertrude Arthur Jeanglaude
(74) *Attorney, Agent, or Firm* — Sughrue Mion, PLLC

(57) ABSTRACT

An upper display region and a lower display region are provided on a display surface of a single display device used for a combination meter device or the like for a vehicle, and by reflecting a light image of a real image displayed in the lower display region by a reflecting member and projecting the light image in a state of overlapping the upper display region, a virtual image and a portion of the real image are simultaneously displayed to be overlapped on the same region. By arranging the lower display region in a place that becomes a blind spot of a structure such as a steering wheel, it is possible to effectively utilize a space of the blind spot for performing display. By allowing an inclination angle of the reflecting member to be adjusted, position alignment between a region of the real image and a region of the virtual image is implemented even when a viewpoint EP position is changed.

6 Claims, 17 Drawing Sheets

(56) References Cited

U.S. PATENT DOCUMENTS

2019/0162961 A1    5/2019  Yokoe et al.
2021/0063742 A1*   3/2021  Lee .................... G02B 27/0176

FOREIGN PATENT DOCUMENTS

| DE | 10 2005 011 093 A1 | 9/2006 |
| DE | 10 2008 000 923 A1 | 10/2008 |
| EP | 3 012 680 A1 | 4/2016 |
| JP | 4-194977 A | 7/1992 |
| JP | 2006-58752 A | 3/2006 |
| JP | 2007-51919 A | 3/2007 |
| JP | 2007-57350 A | 3/2007 |
| JP | 2016-99437 A | 5/2016 |
| JP | 2020-154004 A | 9/2020 |
| WO | 2016/013081 A1 | 1/2016 |

* cited by examiner

ON-VEHICLE DISPLAY APPARATUS

CROSS REFERENCE TO RELATED APPLICATIONS

This application is based on and claims priority from Japanese patent applications No. 2020-094300 filed on May 29, 2020 and No. 2021-064414 filed on Apr. 5, 2021, the entire contents of which are incorporated herein by reference.

TECHNICAL FIELD

The present invention relates to an on-vehicle display apparatus that can be installed, for example, in an instrument panel portion of a vehicle.

BACKGROUND ART

In a vehicle such as an automobile, measuring instruments such as speedometers, tachometers, and fuel gauges are generally installed as meter devices at positions of an instrument panel in front of a driver, that is, in an instrument panel portion. In recent years, in many cases, the measuring instruments are displayed by using display devices such as liquid crystal display panels. In many cases, display devices such as a car navigation device are often installed.

From the viewpoint of safety and the like, the above-mentioned meter device is required to have high visibility. When external light such as direct sunlight is incident, the visibility of the display on the meter device is significantly decreased. On the contrary, light reflected on a surface of the meter device may generate glare on a windshield in front of the meter device, and thus, a driving field of view may be obstructed. Usually, a hood for blocking the external light or the like is configured to be installed above the meter device so that the external light having high illuminance is not incident on the front surface of the meter device as direct light.

When the hood is installed, the design restrictions in the vicinity of the meter device become large, so that an attempt is made to abolish the hood for the meter device. Even if the hood is abolished, it is necessary to sufficiently prevent a decrease in visibility and a glare on the windshield. It is considered that, by moving the installation position of the meter device closer to the driver side, the external light such as direct sunlight is prevented from being incident on a display surface of the meter device.

When the meter device is brought closer to the driver, it becomes difficult to adjust the focal length of the driver's eyes to visually recognize the display of the meter device. That is, the driver normally drives the vehicle in a state of focusing on a distant front field of view, but it is necessary to move the line of sight in order to visually recognize the display of the meter device at a short distance, and at the same time, the display content cannot be visually recognized unless the focal length of the eyes is quickly adjusted to a short distance.

A vehicle meter device of JP-A-2007-51919 displays a meter display having a degree of freedom in visual expression to be increased up to the entire meter panel, and the depth of the device is set to be thinner so that layout is improved. Specifically, a vehicle meter device 1 that performs meter display of a vehicle state with an image includes a central indicator 2 that performs display with a real image of a liquid crystal image, an upper indicator 3, a left side indicator 4, a right side indicator 5, and mirrors 6, 7, and 8 that perform display with virtual images divided around the real image and a real image 2a by the central indicator 2 and virtual images 3b, 4b, and 5b by the upper indicator 3, the left side indicator 4, the right side indicator 5, and the mirrors 6, 7, and 8 are displayed to be overlapped. In actual cases, as illustrated in FIGS. 8 and 9, each of the virtual images 3b, 4b, and 5b does not overlap the real image 2a and is displayed at the position of each region adjacent to the outside of the region.

A liquid crystal meter device of JP-A-2007-57350 can display a meter display having a degree of freedom in visual expression to be increased up to the entire meter panel, and the depth of the device is set to be thinner, so that layout is improved. Specifically, a vehicle meter device 1 that performs meter display of the vehicle state with an image includes a front indicator 2 that displays a display 2a based on a real image of a liquid crystal image, a rear indicator 3 that displays the liquid crystal image on the back of the front indicator 2, and an upper mirror 5 that reflects the display of the rear indicator 3 forward and performs the display with the virtual image. It is illustrated that the virtual image display of the rear indicator 3 is divided and performed around the real image display, and portions of the real image display and the virtual image display are overlapped.

"A vehicular display module" of EP Patent Application Publication No. 3012680 represents a display system in which a head-up display (HUD) and a head-down display (HDD) are combined.

As described above, in a case where the meter device or the like of the vehicle is arranged close to the driver's position in order to avoid the influence of the external light, the burden of adjusting the focus of the driver's eyes becomes increased, and there is a concern that the visibility is deteriorated. In the case of intending to solve such a problem of the focal length, it is considered to increase the distance from the driver's viewpoint position to the displayed virtual image by using a head-up display. In order to enable simultaneous display of various information, as disclosed in JP-A-2007-51919, JP-A-2007-57350, and EP Patent Application Publication No. 3012680, it is assumed that a display for displaying the real image and a display for displaying a virtual image are combined.

It is necessary to prepare a display for the real image and a display for a virtual image, respectively, and thus, the increase in the cost of parts constituting the display system is inevitable. In order to arrange each of the plurality of displays, it is necessary to secure a relatively large space inside the instrument panel portion or the dashboard on the vehicle.

For example, in the case of a combination meter, it is necessary to display a plurality of measuring instruments at the same time on a screen of one display, and thus, the screen requires a relatively large display area. Since an in-vehicle structure such as a circular steering wheel existing between the driver and the meter device may obstruct the driver's field of view, there is a possibility that the display content of a portion of the screen of the meter device cannot be visually recognized. Even in a case where a display with a large screen area is adopted, a display with a special shape contrived in accordance with the shape of the steering wheel or the like is required in order to configure the entire screen so that the driver can visually recognize the entire screen at the same time. It is inevitable that the parts of the display having a special shape becomes expensive. In a case where, in the region on the screen, a place that is hard for the driver to visually recognize, that is, a place that becomes a blind spot due to the influence of the steering wheel or the like is not used for display, the display region becomes wasted.

The on-vehicle display apparatus according to the embodiment can implement a display having good visibility due to easy focus adjustment of the driver's eyes and can avoid complication of the shape and the structure and effectively utilize the entire display region.

SUMMARY OF INVENTION

According to an embodiment of an on-vehicle display apparatus that can be arranged in a position that can be visually recognized from a driver's viewpoint position, the on-vehicle display apparatus comprises:
   a display having a display surface capable of displaying desired visible information as a real image;
   a first display region formed on a portion of the display surface of the display;
   a second display region formed at a portion of the display surface of the display and at a position different from that of the first display region; and
   a virtual image overlapping mechanism having a reflecting surface that reflects a light image displayed as a real image in the second display region and projecting the light image reflected by the reflecting surface as a virtual image in a state where a position of the virtual image overlaps a position of the real image displayed in the first display region when viewed from the viewpoint position.

DESCRIPTION OF EMBODIMENTS

Hereinafter, embodiments of the present invention will be described in detail with reference to the drawings.

Configuration Example 1

Figure 1:
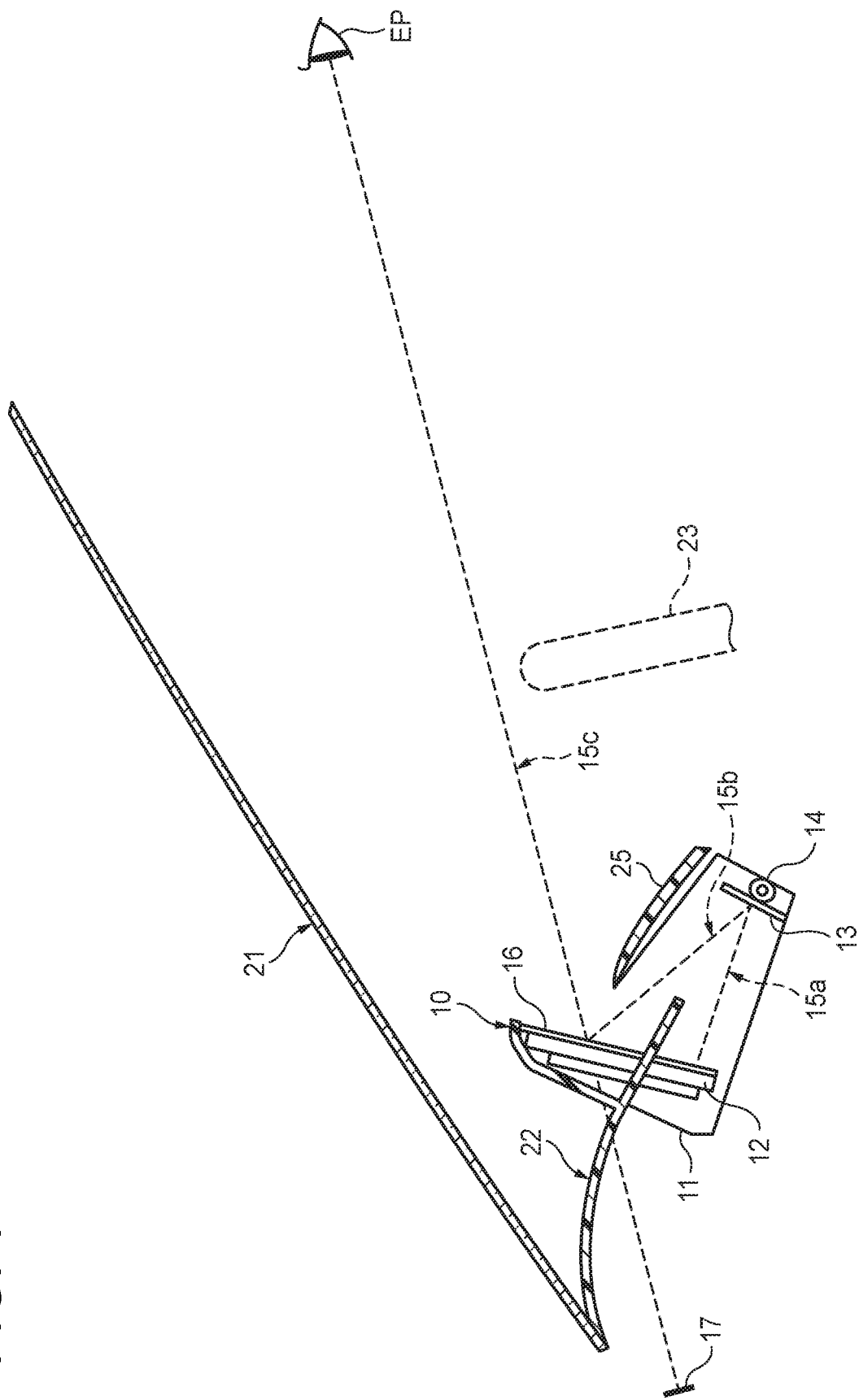
FIG. 1 is a longitudinal cross-sectional view illustrating a state where an on-vehicle display apparatus according to an embodiment mounted on a vehicle is viewed from a side of the vehicle.
Figure 2:
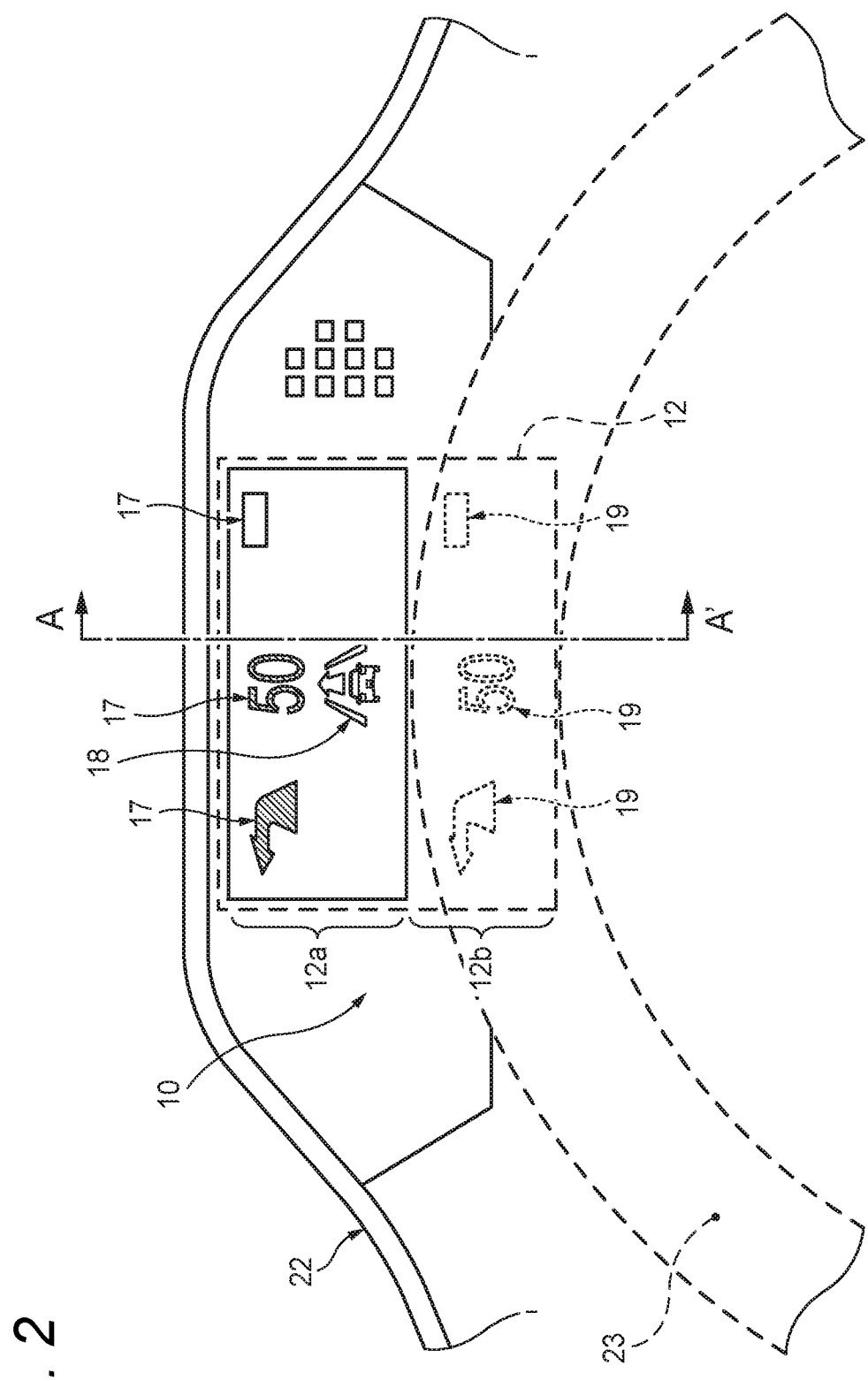
FIG. 2 is a front view illustrating an example of a state where the on-vehicle display apparatus is viewed from the driver's viewpoint side.

FIG. 1 illustrates a state where an on-vehicle display apparatus 10 according to the present embodiment mounted on a vehicle is viewed from a left side of the vehicle. FIG. 2 illustrates an example of a state where the on-vehicle display apparatus 10 is viewed from a driver's viewpoint EP side.

Physical Configuration Viewed from Side

The on-vehicle display apparatus 10 illustrated in FIG. 1 is a combination meter device capable of displaying various measuring instruments. As illustrated in FIG. 1, the on-vehicle display apparatus 10 is installed in an instrument panel portion on the front side of a dashboard 22. That is, the on-vehicle display apparatus 10 is arranged in the instrument panel portion in front of the driver sitting in the driver's seat of the vehicle.

A steering wheel 23 exists between the driver's viewpoint EP and the on-vehicle display apparatus 10. Since an optical path 15c illustrated in FIG. 1 passes above the steering wheel 23, when a driver's line of sight is directed in the direction corresponding to the optical path 15c, the display of the on-vehicle display apparatus 10 can be visually recognized.

In the on-vehicle display apparatus 10 of FIG. 1, there is no hood for blocking the external light from above. Therefore, the display of the on-vehicle display apparatus 10 is easily affected by the external light such as direct sunlight transmitting through a windshield (window glass) 21 above the on-vehicle display apparatus 10 and being incident on the on-vehicle display apparatus 10, and the visibility of the display tends to be decreased. In order to reduce the glare at night on the windshield that enters the driver's field of view, it is necessary to arrange the on-vehicle display apparatus 10 at a position close to the driver.

When the installation position of the on-vehicle display apparatus 10 is brought closer to the driver, the driver needs to visually recognize the display at a closer distance to himself/herself, and thus, it is difficult to adjust the focus of the eyes. That is, in a normal driving state, the driver visually recognizes a relatively distant foreground in the front field of view, but from that state, when the line of sight is moved in the direction of the on-vehicle display apparatus 10 at a closer position, the display of the on-vehicle display apparatus 10 cannot be visually recognized unless the focus of the eyes is adjusted significantly. For this reason, the on-vehicle display apparatus 10 is provided with a function for preventing a decrease in visibility due to the focal length.

Specifically, the on-vehicle display apparatus 10 can display the information of the measuring instrument as a virtual image 17 in the same manner as a general head-up display (HUD). The on-vehicle display apparatus 10 can display the virtual image 17 and a real image in a state of being overlapped on the same region. Since the virtual image 17 is formed on the extension line of the optical path 15c as illustrated in FIG. 1 so as to exist farther from the on-vehicle display apparatus 10 when viewed from a viewpoint EP, it is easy for the driver to focus the eyes on the virtual image 17 during the driving, and the virtual image 17 can be visually recognized easier than the real image on the on-vehicle display apparatus 10.

As illustrated in FIG. 1, a display device 12, a reflecting member 13, and a stepping motor 14 are accommodated in an apparatus housing 11 of the on-vehicle display apparatus 10. The display device 12 is a flat plate-shaped full-color TFT liquid crystal display and includes a backlight for illumination. The display device 12 can display various visible information as the real image on the entire screen on the viewpoint EP side. As described later, the screen of the display device 12 is divided into two upper and lower regions in terms of control, and each region is individually managed.

The reflecting member 13 is supported in the apparatus housing 11 by a support mechanism including the stepping motor 14 and has a movable structure that can adjust an inclination angle in the clockwise and counterclockwise directions around a rotation axis oriented in a direction perpendicular to the paper surface in FIG. 1, that is, in the left-right direction of the vehicle body. By driving the stepping motor 14, the inclination angle of the reflecting member 13 can be changed as needed.

Since the reflecting member 13 is arranged in front of the lower region separated from the display screen of the display device 12, the light of the real image displayed in the lower region is incident on the surface of the reflecting member 13 through an optical path 15a. The light incident on the surface of the reflecting member 13 is reflected in the direction of an optical path 15b. The light that passes through the optical path 15b and is directed from the reflecting member 13 toward the display device 12 is reflected by a reflecting surface 16 of the front surface of the display device 12, passes through the optical path 15c, and is directed toward the viewpoint EP.

That is, since the light emitted by the real image displayed in the lower region of the display device 12 is reflected by the reflecting member 13 and the reflecting surface 16 and is directed toward the viewpoint EP, when the light image is viewed from the viewpoint EP, the light image is visually recognized as if the light image exists at the position of the virtual image 17 in front of the reflecting surface 16. The driver can easily visually recognize the virtual image 17 without focusing the eyes on a close position.

The reflecting member 13 may be a flat plate-shaped mirror or may be a magnifying mirror. When the reflecting member 13 is used as a magnifying mirror, it is possible to project a virtual image having a size larger than that of a lower display region 12b.

As illustrated in FIG. 1, a light-shielding front cover 25 is installed on the front side (the side closer to the viewpoint EP) of the lower region of the display device 12. Even if the driver moves the viewpoint EP slightly above the normal position and views from above the steering wheel 23, the real image displayed in the lower region of the display device 12 is configured to be invisible with being hidden inside the front cover 25.

Structure Viewed from Front

As illustrated in FIG. 2, the display screen of the display device 12 is arranged at a substantially central portion of the on-vehicle display apparatus 10 having a horizontally long shape. The display screen of the display device 12 has a shape close to a square and is configured with an upper display region 12a and a lower display region 12b divided in the vertical direction.

Although the display device 12 is accommodated inside the apparatus housing 11, the upper display region 12a can be visually recognized from the position of the viewpoint EP illustrated in FIG. 1 through the opening of the apparatus housing 11. Since the steering wheel 23 exists on the front side (the side closer to the driver) of the lower display region 12b, the lower display region 12b is in a position where the lower display region 12b becomes a blind spot, and the lower display region 12b cannot be visually recognized from the position of the normal viewpoint EP.

The on-vehicle display apparatus 10 can display desired visible information as a real image 18 in the upper display region 12a of the display device 12, and the on-vehicle display apparatus 10 can also display another visible information as a real image 19 in the lower display region 12b. Since the real image 19 is displayed at a place that becomes a blind spot of the steering wheel 23, the real image 19 cannot be viewed from the position of the viewpoint EP.

In the example of FIG. 2, the visible information displayed as the real image 18 includes the operating state of LKA, ACC, and the like of an ADAS function and the background image, and the like. The visible information displayed as the real image 19 contains a pattern indicating that the current vehicle speed is 50 km/h, an arrow pattern such as a turn-by-turn indicating that the own vehicle is scheduled to turn left at an intersection in the front, and information such as the operating state of other devices. Each of the visible information of the real images 18 and 19 can be generated inside the on-vehicle display apparatus 10 as information indicating the current situation based on the signals obtained from the outputs of various sensors mounted on the own vehicle.

As illustrated in FIG. 2, the same content as the real image 19 displayed in the lower display region 12b is displayed as the virtual image 17 in the upper display region 12a. That is, the real image 18 and the virtual image 17 are displayed in an overlapped state in the same upper display region 12a.

The virtual image 17 displayed in the upper display region 12a is an optical image that reaches the viewpoint EP through the optical paths 15a, 15b, and 15c as a result of reflecting the light of the real image 19 displayed in the lower display region 12b by the reflecting member 13 and the reflecting surface 16 illustrated in FIG. 1, respectively. The virtual image 17 is visually recognized by the driver as if the virtual image 17 exists at a place farther than the reflecting surface 16. The real image 19 in the lower display region 12b is invisible to the driver because the real image 19 is in the blind spot, but the virtual image 17 is arranged in the upper display region 12a, so that the virtual image 17 can be visually recognized by the driver at the position of the viewpoint EP together with the real image 18. The lower display region 12b of the display device 12 located at the blind spot can be effectively used.

In the region other than the display device 12 on the on-vehicle display apparatus 10, for example, it is assumed that a plurality of indicators for outputting various alarms are individually arranged, or measuring instruments that cannot be displayed in the display device are arranged as needed.

Modified Example 1 of Screen Configuration

Figure 3:
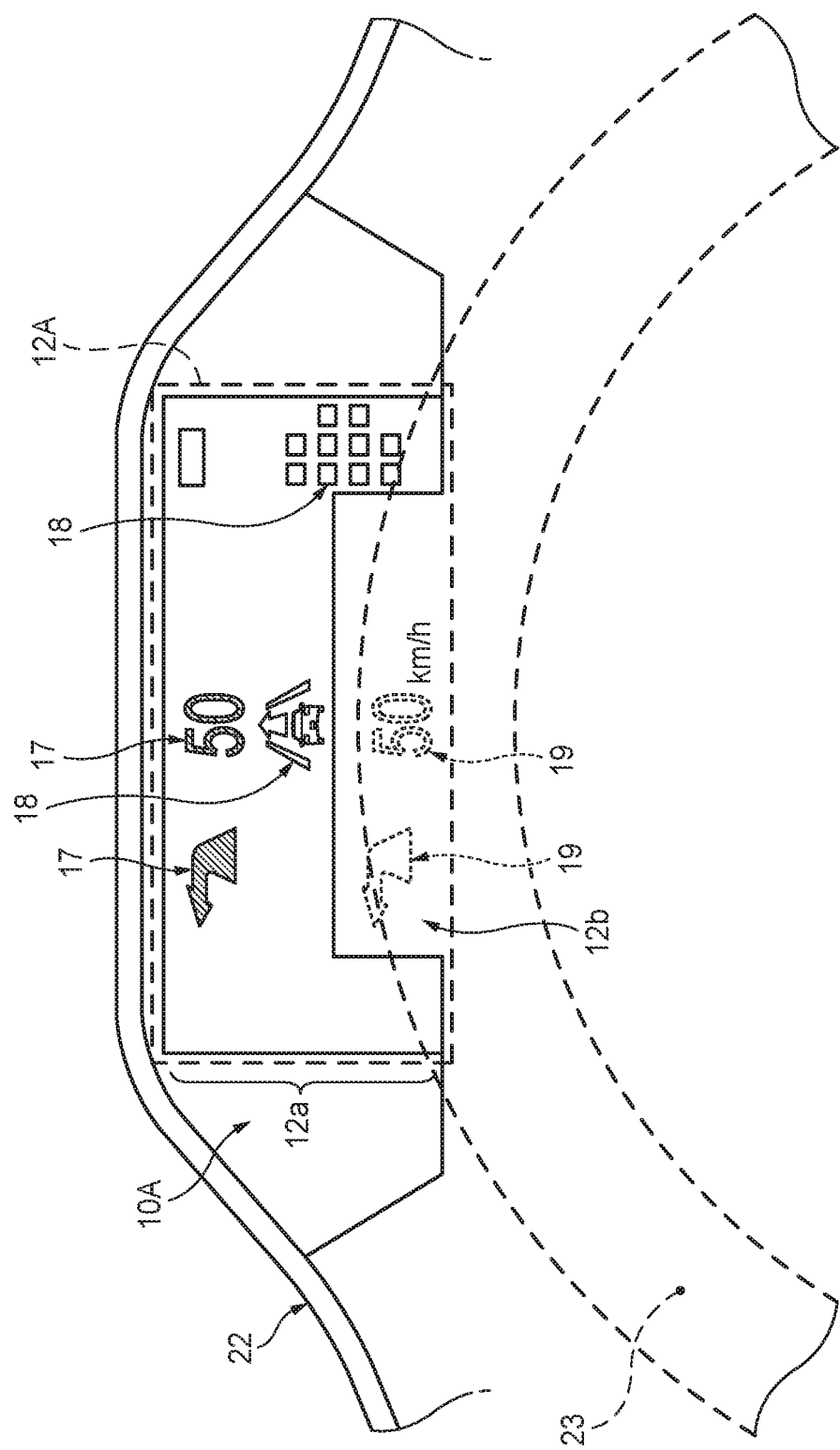
FIG. 3 is a front view illustrating an example of a state where an on-vehicle display apparatus according to Modified Example 1 is viewed from the driver's viewpoint side.

FIG. 3 illustrates an example of a state where an on-vehicle display apparatus 10A according to Modified Example is viewed from the driver's viewpoint EP side.

As illustrated in FIG. 3, a display device 12A mounted on the on-vehicle display apparatus 10A has a larger outer shape than the display device 12 in FIG. 2 and has a horizontally long screen shape. A lower display region 12b illustrated in FIG. 3 is arranged on the lower side of the screen of the display device 12, has a width narrower than that of an upper display region 12a, and has a horizontally long shape.

That is, when viewed from a normal driver's viewpoint EP, the lower display region 12b is allocated so as to substantially coincide with the region that becomes the blind spot of the steering wheel 23. The upper display region 12a of the display device 12A is allocated to a region other than the lower display region 12b out of the entire screen, that is, a region where the real image can be directly visually recognized by the driver from the viewpoint EP without becoming the blind spot of the steering wheel 23. When a meter exterior structure is configured to be simple, the entire lower side of the display device may be used as the region represented by the reference numeral 12b.

Configuration of Display Device

Figure 4:
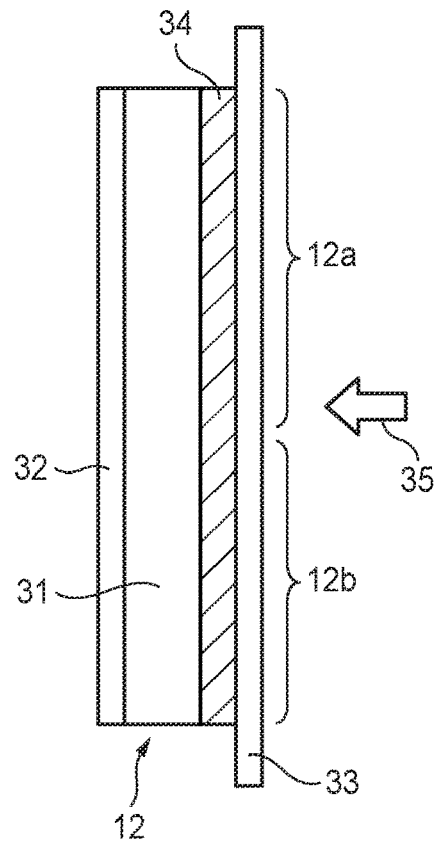
FIG. 4 is a cross-sectional view of a display device illustrating a state where a cross section taken along line A-A' in FIG. 2 is viewed.

FIG. 4 illustrates a cross-sectional structure of the display device 12 in a state where the cross section taken along line A-A' in FIG. 2 is viewed. A front-side viewing direction 35 illustrated in FIG. 4 represents a direction in which the driver visually recognizes the screen of the display device 12 from the viewpoint EP side.

The display device 12 illustrated in FIG. 4 is configured with a liquid crystal display panel 31, a backlight 32, a cover glass 33, and an optical transparent adhesive 34. The optical transparent adhesive 34 is an optical clear resin (OCR) or an optical clear adhesive (OCA).

In FIG. 4, the right end side of the liquid crystal display panel 31 is the display screen. The backlight 32 is attached to the back side of the liquid crystal display panel 31. In order to realize the light reflection characteristics necessary for forming the clear virtual image 17, the cover glass 33 is arranged on the right end side of the liquid crystal display panel 31. The surface of the cover glass 33 becomes the reflecting surface 16. The external dimensions of the cover glass 33 are slightly larger than those of the liquid crystal display panel 31. The cover glass 33 is adhered by using the optical transparent adhesive 34 so as to cover the entire surface of the liquid crystal display panel 31.

Since the display device 12 includes the backlight 32, the light image of the real image 19 displayed in the lower display region 12b of the display device 12 can be emitted to the reflecting member 13 side by using the illumination light, and thus, it becomes possible to form the virtual image 17. The real image 18 of the upper display region 12a can be displayed more clearly.

When the cover glass 33 does not exist in the display device 12, it is assumed that a half mirror or a glass that can be used as a substitute is arranged on the front side of the screen of the display device 12 to form the reflecting surface 16. When there is no hood that blocks light above as in the on-vehicle display apparatus 10 of FIG. 1, it is desirable that a light control film (LCF) is provided on the surface of the display device 12 so that an unnecessary light image is prevented from being glared in the windshield 21.

Screen Display Layout 1

Figure 5:
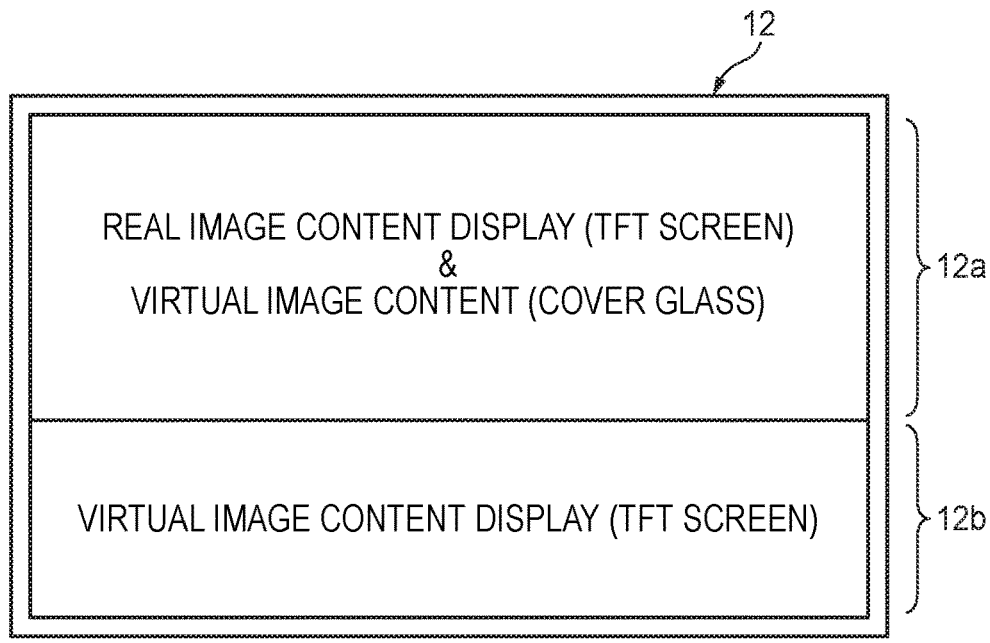
FIG. 5 is a front view illustrating an example of a screen display layout in the on-vehicle display apparatus of FIG. 2.

An example of the screen display layout in the on-vehicle display apparatus 10 of FIG. 2 is illustrated in FIG. 5.

As illustrated in FIG. 5, the control unit of the on-vehicle display apparatus 10 described later controls the contents displayed in the upper display region 12a and the lower display region 12b, respectively. That is, the control unit displays the virtual image content corresponding to the content of the virtual image 17 as the real image 19 on the screen (TFT screen of the liquid crystal display panel 31) of the lower display region 12b. The control unit displays the real image content corresponding to the content of the real image 18 as the real image 18 on the screen (TFT screen of the liquid crystal display panel 31) of the upper display region 12a.

The virtual image content displayed to be overlapped in the upper display region 12a has the same content as the real image 19 in the lower display region 12b and is projected onto the surface of the cover glass 33 by the reflection of the reflecting member 13. In the configuration of FIG. 1, since the virtual image 17 is formed by two times of reflection on the surface of the reflecting member 13 and the surface of the cover glass 33, the orientation of the real image 19 in the lower display region 12b and the orientation of the virtual images 17 in the upper display region 12a are the same.

In actual cases, since the lower display region 12b of the display device 12 is arranged at a place that becomes a blind spot of the steering wheel 23, the virtual image content of the lower display region 12b cannot be viewed from the viewpoint EP, and the real image content and the virtual image content in the upper display region 12a are visually recognized by the driver at the position of the viewpoint EP.

Screen Display Layout 2

Figure 6:
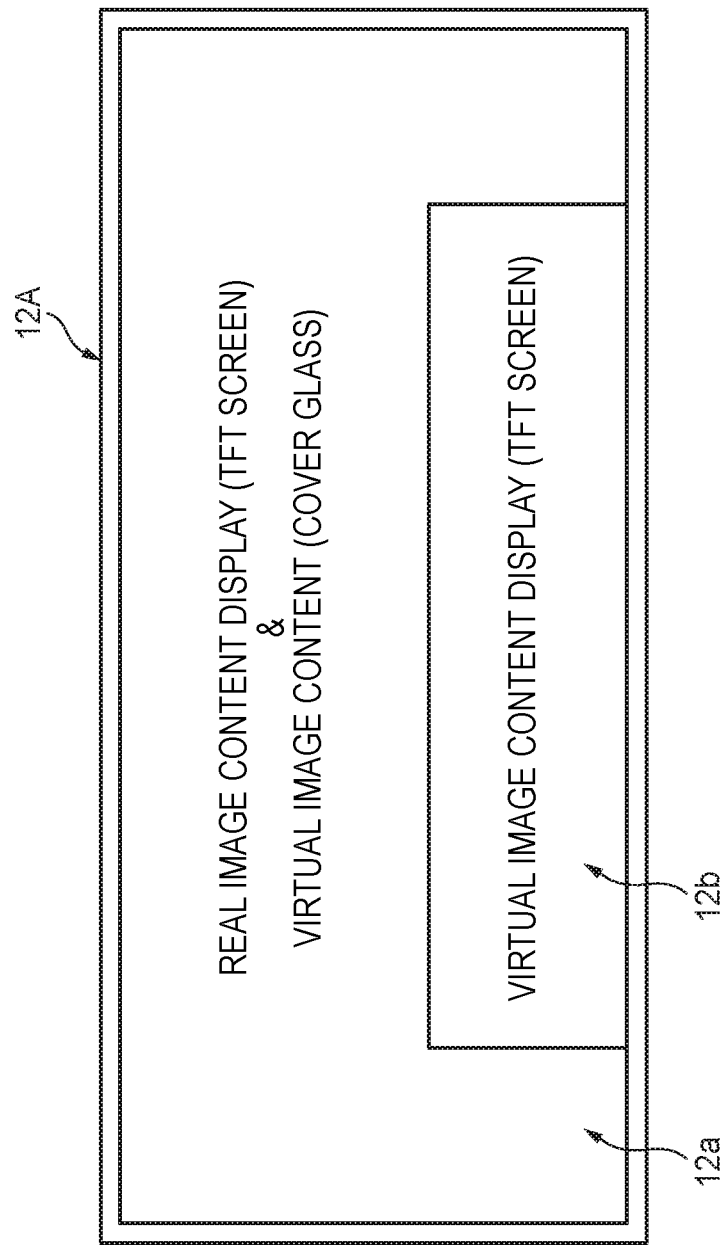
FIG. 6 is a front view illustrating an example of a screen display layout in the on-vehicle display apparatus of FIG. 3.

An example of the screen display layout in the on-vehicle display apparatus 10A of FIG. 3 is illustrated in FIG. 6.

As illustrated in FIG. 6, the control unit of the on-vehicle display apparatus 10A controls the contents displayed in the upper display region 12a and the lower display region 12b of the display device 12A, respectively. That is, the control unit displays the virtual image content corresponding to the content of the virtual image 17 as the real image 19 on the screen (TFT screen of the liquid crystal display panel 31) of the lower display region 12b of the display device 12A. The control unit displays the real image content corresponding to the content of the real image 18 as the real image 18 on the screen (TFT screen of the liquid crystal display panel 31) of the upper display region 12a.

The virtual image content displayed to be overlapped in the upper display region 12a has the same content as the real image 19 in the lower display region 12b of the display device 12A and is projected onto the surface of the cover glass 33 by the reflection of the reflecting member 13. In the configuration of FIG. 1, since the virtual image 17 is formed by two times of reflection on the surface of the reflecting member 13 and the surface of the cover glass 33, the orientation of the real image 19 in the lower display region 12b and the orientation of the virtual images 17 in the upper display region 12a are the same.

In actual cases, since the lower display region 12b of the display device 12A is arranged at a place that becomes a blind spot of the steering wheel 23, the virtual image content of the lower display region 12b cannot be viewed from the viewpoint EP, and the real image content and the virtual image content in the upper display region 12a are visually recognized by the driver at the position of the viewpoint EP.

System Configuration

Figure 7:
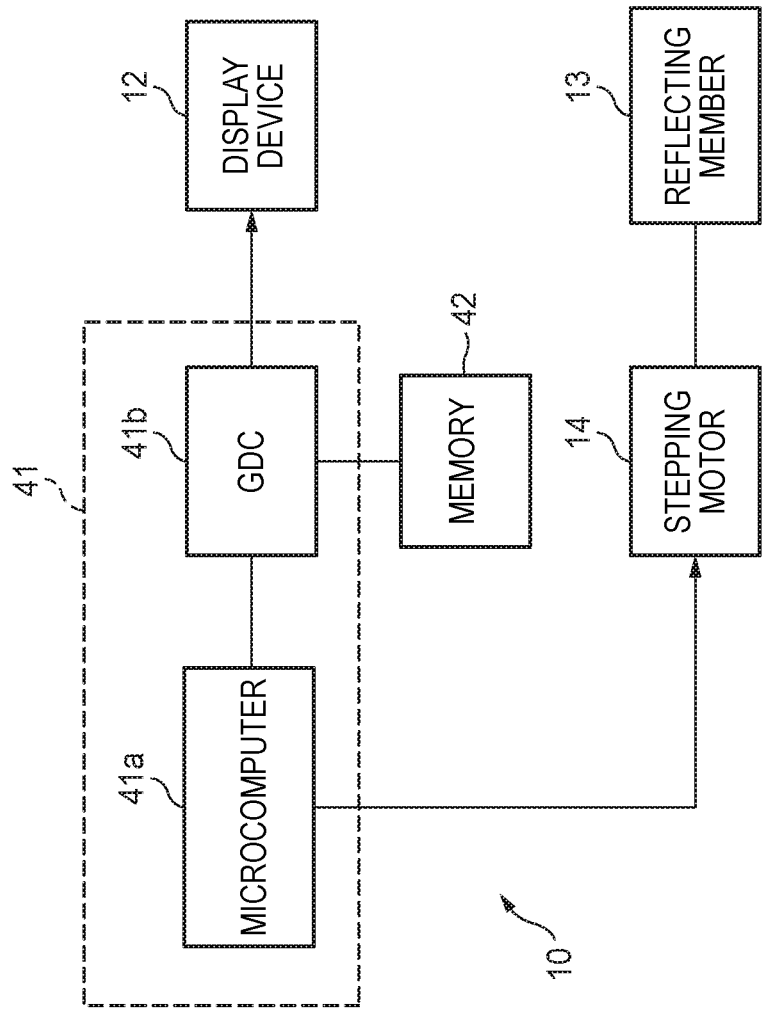
FIG. 7 is a block diagram illustrating a system configuration example of the on-vehicle display apparatus.

An example of the system configuration of the on-vehicle display apparatus 10 is illustrated in FIG. 7.

As illustrated in FIG. 7, the on-vehicle display apparatus 10 includes a control unit 41. In the example of FIG. 7, a microcomputer 41a and a graphic display controller (GDC) 41b are included inside the control unit 41. The microcomputer 41a and the GDC 41b can also be integrated. The on-vehicle display apparatus 10 is provided with a memory 42 that can be used to store data to be displayed on the screen.

The microcomputer 41a of the control unit 41 operates according to a program incorporated in advance and can perform various controls for realizing functions required for the on-vehicle display apparatus 10. The microcomputer 41a acquires information indicating a current state of the vehicle via an in-vehicle network (not illustrated) and reflects the acquired information on the screen displays of the upper display region 12a and the lower display region 12b of the display device 12.

When the microcomputer 41a detects a predetermined switch operation by the driver or the like, the microcomputer 41a can drive the stepping motor 14 in the forward rotation direction or the reverse rotation direction to change the inclination angle of the reflecting member 13. Accordingly, it is possible to correct a position shift between the display of the real image 18 and the display of the virtual image 17 on the upper display region 12a in accordance with the position of the actual viewpoint EP.

For example, a vehicle speed pulse signal output by a vehicle speed sensor provided to the vehicle (or received via an in-vehicle network) is input to the microcomputer 41a. The microcomputer 41a sequentially calculates the latest vehicle speed (km/h) based on the input vehicle speed data. In addition to the vehicle speed information, a display pattern representing contents such as a vehicle state and a message is written in the memory 42, and the contents are displayed as the real image 19 in the lower display region 12b of the display device 12 via the GDC 41b. By the light image projected on the reflecting surface 16 in front of the upper display region 12a based on the real image 19, the virtual image 17 is displayed in a state of being overlapped on the real image 18, for example, as illustrated in FIG. 2.

Modified Example 2 of Screen Configuration

Figure 8:
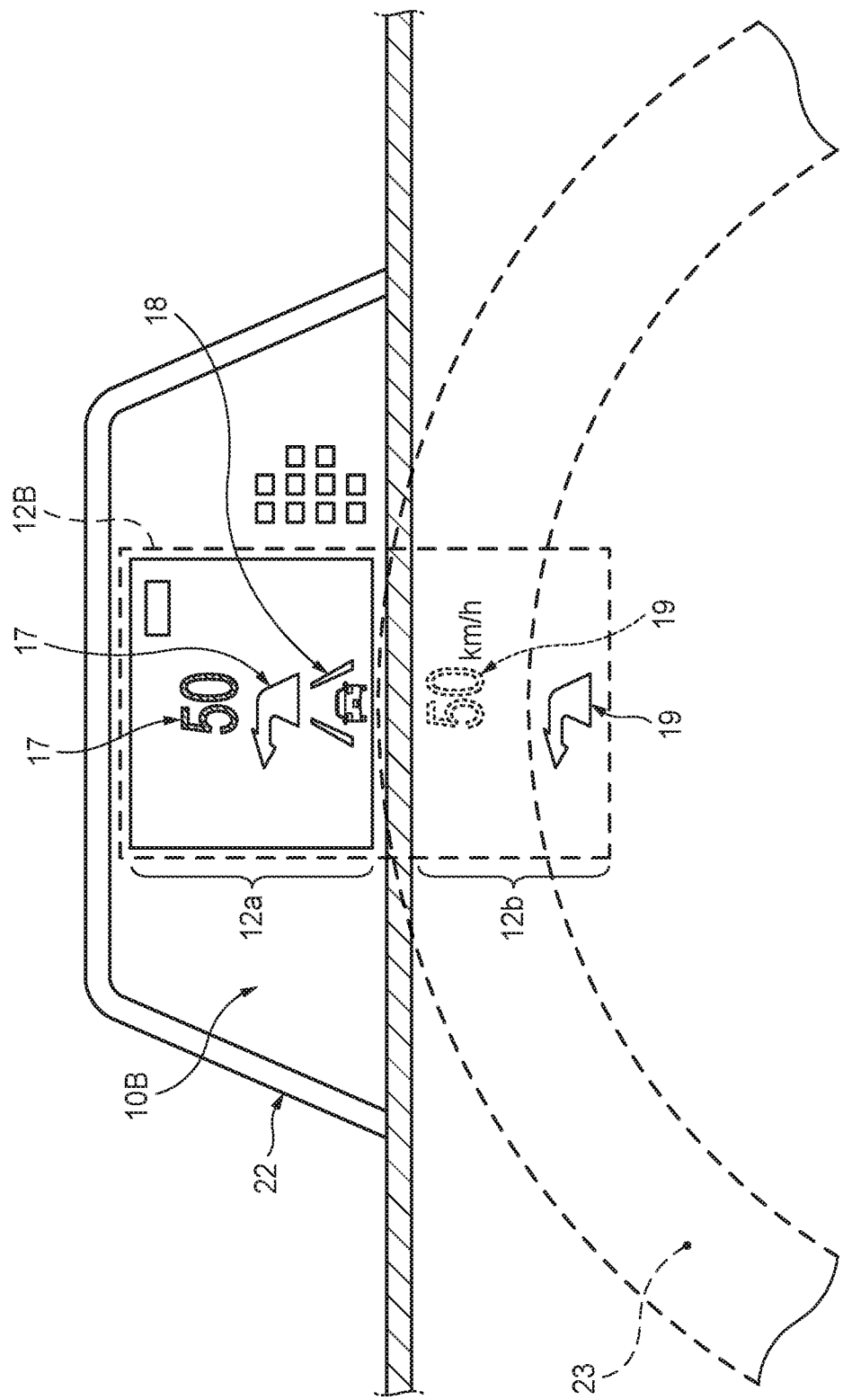
FIG. 8 is a front view illustrating an example of a state where an on-vehicle display apparatus according to Modified Example 2 is viewed from the driver's viewpoint side.

FIG. 8 illustrates an example of a state where an on-vehicle display apparatus 10B according to Modified Example is viewed from the driver's viewpoint EP side.

In the example of FIG. 8, the display device 12B mounted on the on-vehicle display apparatus 10B is arranged in a vertically long screen shape in which the display device 12 in FIG. 2 is rotated by 90°. The upper display region 12a illustrated in FIG. 8 has a rectangular shape close to a square, and the lower display region 12b has a rectangular shape of which vertical dimension is slightly smaller than that of the upper display region 12a.

In the on-vehicle display apparatus 10B illustrated in FIG. 8, the display device 12B is arranged substantially at the center of the on-vehicle display apparatus 10B. The upper display region 12a of the display device 12B is arranged at a position where the upper display region 12a can be visually recognized from the viewpoint EP through the opening of the dashboard 22, but the lower display region 12b is arranged inside the dashboard 22 and is arranged at a position that becomes a blind spot of the steering wheel 23.

In the on-vehicle display apparatus 10B of FIG. 8, the real image 19 displayed in the lower display region 12b cannot be visually recognized from the viewpoint EP, but the virtual image 17 projected on the upper display region 12a based on the real image 19 can be visually recognized by the driver from the viewpoint EP together with the real image 18. Since the virtual image 17 is formed so as to be located farther (forward) from the display device 12B, it is easy for the driver to adjust the focus for visually recognizing the virtual image 17, and it is easy to visually recognize the virtual image 17 even during driving.

Visible Range and Blind Spot on Display Surface

Figure 9:
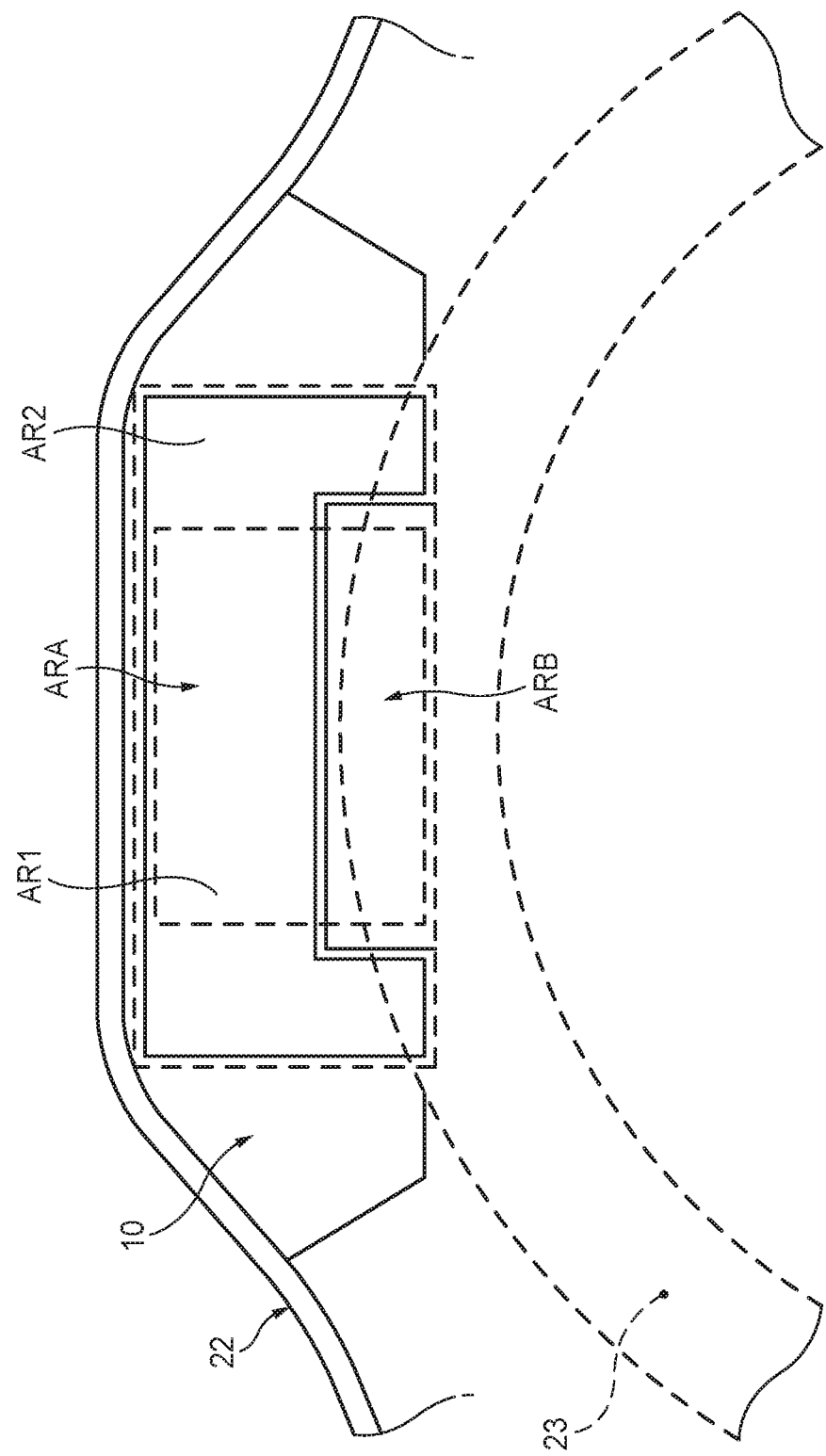
FIG. 9 is a front view illustrating a range visible to the driver and a range of a blind spot on the display surface of the on-vehicle display apparatus.

FIG. 9 illustrates a range visible to the driver and a range of a blind spot on the display surfaces of the on-vehicle display apparatus 10 of FIG. 2 and the on-vehicle display apparatus 10A of FIG. 3.

A display region AR1 illustrated in FIG. 9 represents a range of the entire display screen of the display device 12, and a display region AR2 represents a range of the entire display screen of the display device 12A. In the case of the on-vehicle display apparatus 10, in the display region AR1, the upper display region 12a becomes a visible region ARA, and the lower display region 12b becomes a blind spot region ARB. In the case of the on-vehicle display apparatus 10A, in the display region AR2, the upper display region 12a becomes the visible region ARA, and the lower display region 12b becomes the blind spot region ARB.

That is, in both of the on-vehicle display apparatuses 10 and 10A, since the visible region ARA exists above the steering wheel 23, the visible region ARA can be visually recognized from the normal viewpoint EP, but since the blind spot region ARB becomes a blind spot of the steering wheel 23, and the blind spot region ARB cannot be visually recognized. The virtual image 17 projected on the upper display region 12a based on the real image 19 displayed on the lower display region 12b corresponding to the blind spot region ARB appears in the visible region ARA together with the real image 18. The driver can visually recognize the virtual image 17 and the real image 18 without being affected by the blind spot caused by the existence of the steering wheel 23.

Configuration Example 2

Figure 10:
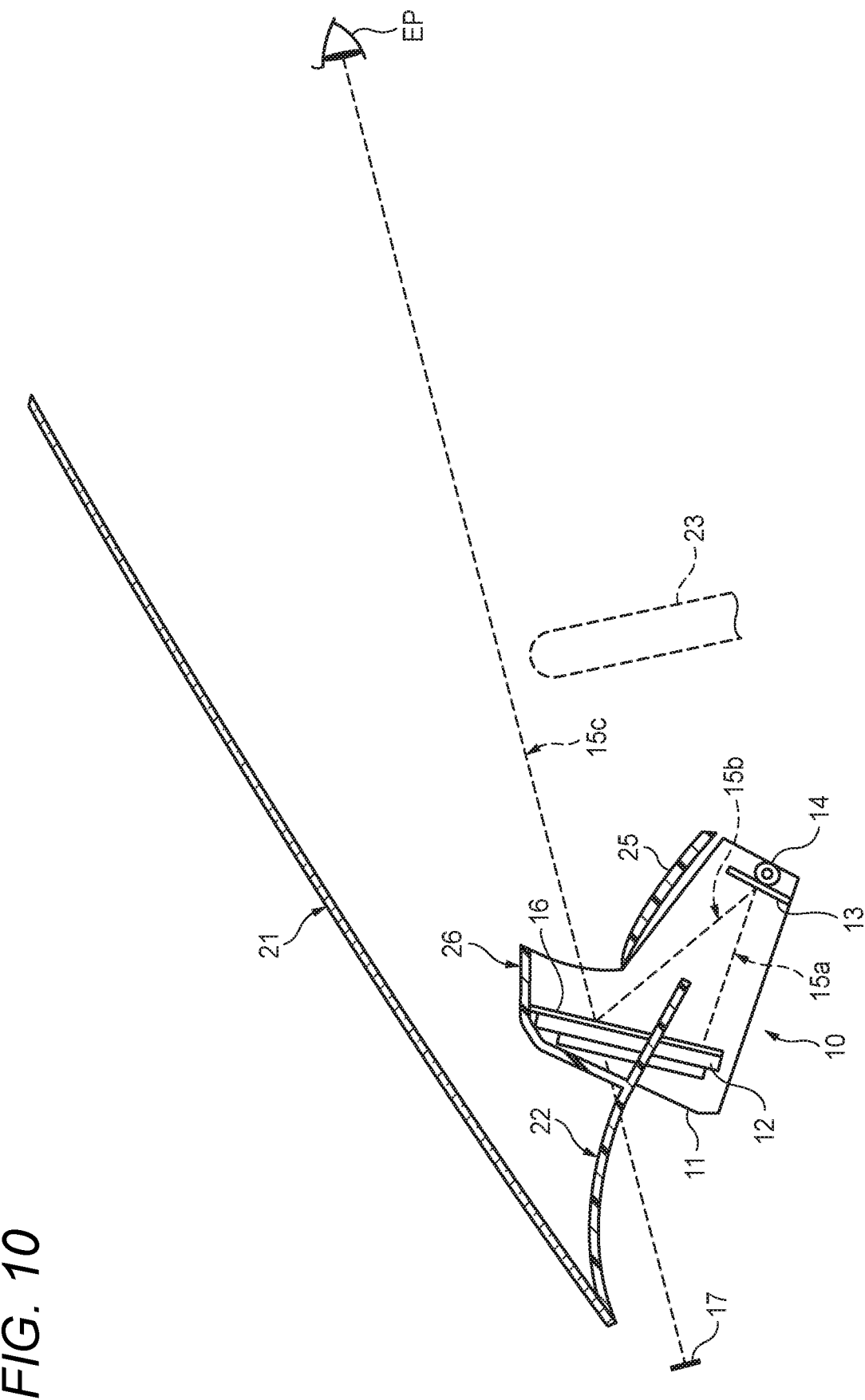
FIG. 10 is a longitudinal cross-sectional view illustrating a state where the on-vehicle display apparatus according to Modified Example is viewed from the side of the vehicle.

FIG. 10 illustrates a state where the on-vehicle display apparatus 10 according to Modified Example is viewed from the left side of the vehicle.

In the on-vehicle display apparatus 10 of FIG. 10, a meter hood 26 extending in the horizontal direction is installed above the apparatus housing 11. The meter hood 26 has a function of blocking light in the vertical direction. That is, the meter hood 26 can be used to prevent the external light such as direct sunlight transmitted through the windshield 21 and incident on the interior of the vehicle from adversely affecting the display of the display device 12. In order to prevent the light reflected by the on-vehicle display apparatus 10 and the light generated by the display of the display device 12 from being reflected on the surface of the windshield 21 and glaring in the driver's front field of view, the meter hood 26 is used.

In the case of the on-vehicle display apparatus 10 having the meter hood 26 as illustrated in FIG. 10, since the glare due to the influence of direct sunlight or the like is unlikely to occur, the on-vehicle display apparatus 10 can be installed at a position far away from the viewpoint EP. Accordingly, the focus adjustment becomes easy even when the driver visually recognizes the real image 18 on the display device 12, and the visibility of the real image 18 is improved as compared with the configuration of FIG. 1.

In the example of FIG. 1, although the on-vehicle display apparatus 10 is arranged so that a portion (upper display region 12a) can be visually recognized on the upper side of the steering wheel 23, the on-vehicle display apparatus 10 may be arranged at a position where the driver can visually recognize the entire screen in a state of directing the line of sight to the inside of the steering wheel 23. The on-vehicle display apparatus 10 can be used for a display other than the meter device.

As described above, with the on-vehicle display apparatus 10, the real image 18 and the virtual image 17 can be displayed to be overlapped on the upper display region 12a having a relatively small size by using only a single display device 12. That is, it is not necessary to prepare a plurality of displays, and only one illumination device may be used. By reducing the number of parts, it is possible to reduce the cost and to reduce the space required for the installation. In the on-vehicle display apparatus 10, since the light reflecting member for projecting the virtual image is integrated with the screen of the display device 12, an assembling process can be shortened.

Since the real image 18 and the virtual image 17 are displayed to be overlapped in the same region, it is possible to display with a stereoscopic effect and a floating feeling due to the difference in perspective between the real image 18 and the virtual image 17.

When a combination meter device that can be visually recognized on the upper side of the steering wheel 23 is configured as in the on-vehicle display apparatus 10 of FIG. 1, the movement of the line of sight between the driver's front field of view and the meter screen can be reduced, and by further setting the imaging position of the virtual image 17 to a distance, the focus adjustment of the eyes accompanying the movement of the line of sight becomes easy, and thus, the visibility is improved.

In the on-vehicle display apparatus 10 of FIG. 2, since the virtual image 17 is formed by using the real image 19 displayed in the lower display region 12b located at the place that becomes the blind spot of the steering wheel 23, the space which becomes the blind spot can also be effectively used for display.

Configuration Example 3

Figure 11:
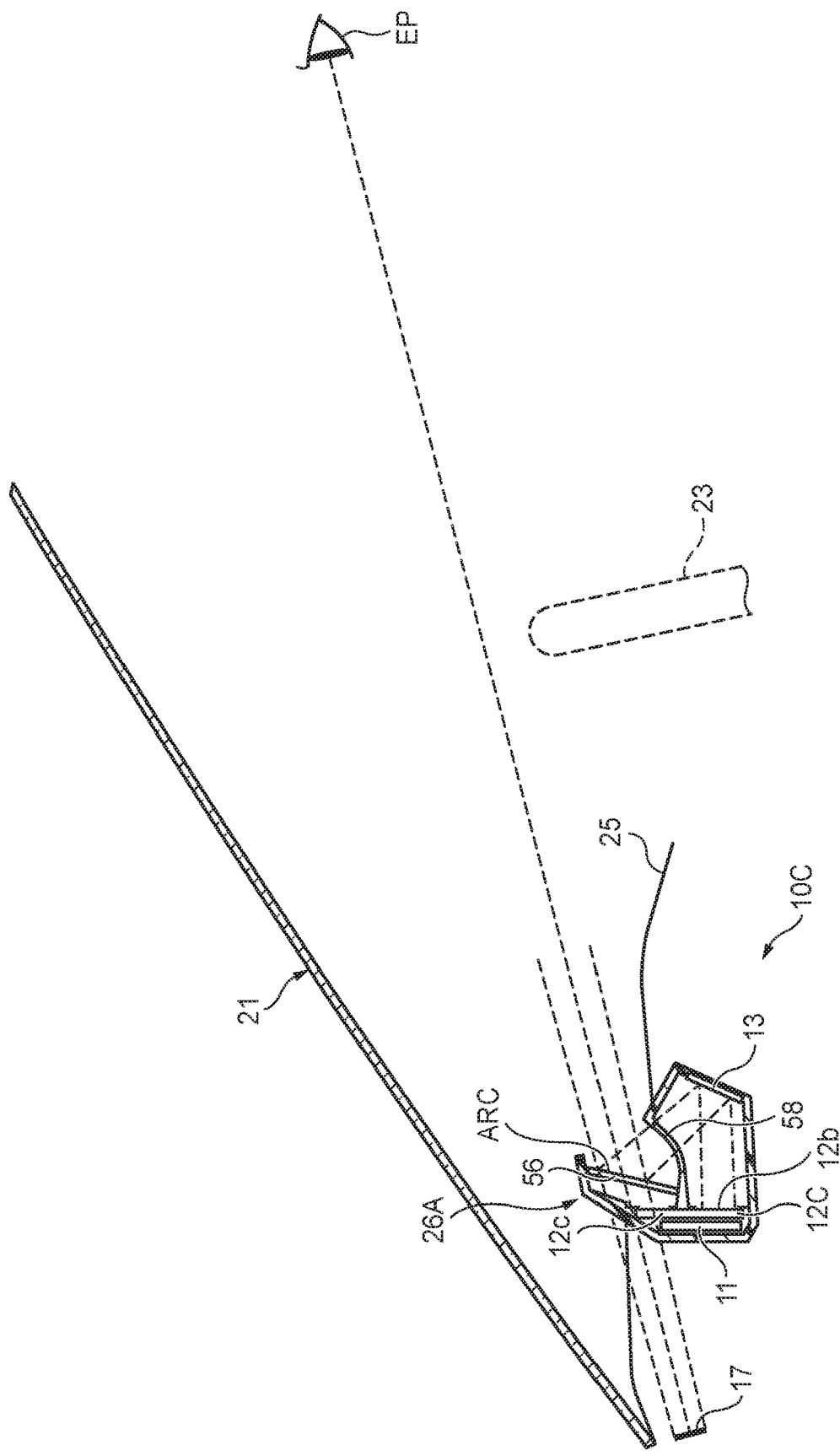
FIG. 11 is a longitudinal cross-sectional view illustrating a state where the on-vehicle display apparatus according to Modified Example is viewed from the side of the vehicle.

FIG. 11 illustrates a state where an on-vehicle display apparatus 10C according to Modified Example is viewed from the left side of the vehicle.

In the on-vehicle display apparatus 10C of FIG. 11, similarly to the on-vehicle display apparatus 10 of FIG. 10, a meter hood 26A extending in the horizontal direction is installed above the apparatus housing 11. A half mirror 56 is arranged below the meter hood 26A. The half mirror 56 is arranged slightly in front of the screen of a display device 12C when viewed from the driver side, that is, at a position close to the viewpoint EP. The half mirror 56 is arranged at a position slightly higher than the screen of the display device 12C and is arranged in a state of being shifted up and down in a positional relationship in which both are partially overlapped when viewed from the driver side.

The half mirror 56 is supported by the meter hood 26A. For example, the half mirror 56 can be attached to the meter hood 26A by a method such as fitting or pasting. The half mirror 56 is made of a resin and is formed as a combiner having a light reflection function for displaying a virtual image and a light transmission function for transmitting light of the real image.

The half mirror 56 is not limited to transparent, and the half mirror 56 may be semi-transparent. For example, in order to prevent the assembled state of the display device 12C behind the half mirror 56 from being viewed from the viewpoint EP side by the light transmitted through the half mirror 56, the light transmittance may be lowered by applying a thin smoke process or the like to the entire surface of the half mirror 56.

In the example of FIG. 11, the half mirror 56 is arranged in a state of being slightly inclined with respect to the display device 12C, but the half mirror 56 is not necessarily arranged to be inclined.

As illustrated in FIG. 11, the light of the content displayed in the lower display region 12b of the display device 12C is reflected by the surface of the reflecting member 13 and transmitted through a glare trap lens 58 to be projected on a virtual image projection region ARC of the surface of the half mirror 56 and directed toward the viewpoint EP. As a result, the driver can visually recognize the light image projected on the half mirror 56 as the virtual image 17 from the position of the viewpoint EP. In a case where the half mirror 56 (or a combiner 55 described later) is installed so as not to cover the optical path from the lower display region 12b to the reflecting member 13, since the light of the content displayed in the lower display region 12b is visually recognized as the virtual image by the driver without being attenuated by the half mirror 56 (or the combiner 55), it is possible for the driver to more clearly visually recognize the virtual image.

The light from the content of the real image displayed in a real image display region 12c on the upper side of the screen of the display device 12C is transmitted through the half mirror 56 or partially passes under the half mirror 56 as direct light toward the viewpoint EP. The driver can simultaneously visually recognize the content of the virtual image projected on the half mirror 56 and the content of the real image displayed in the real image display region 12c of the display device 12C at the position of the viewpoint EP.

Figure 12:
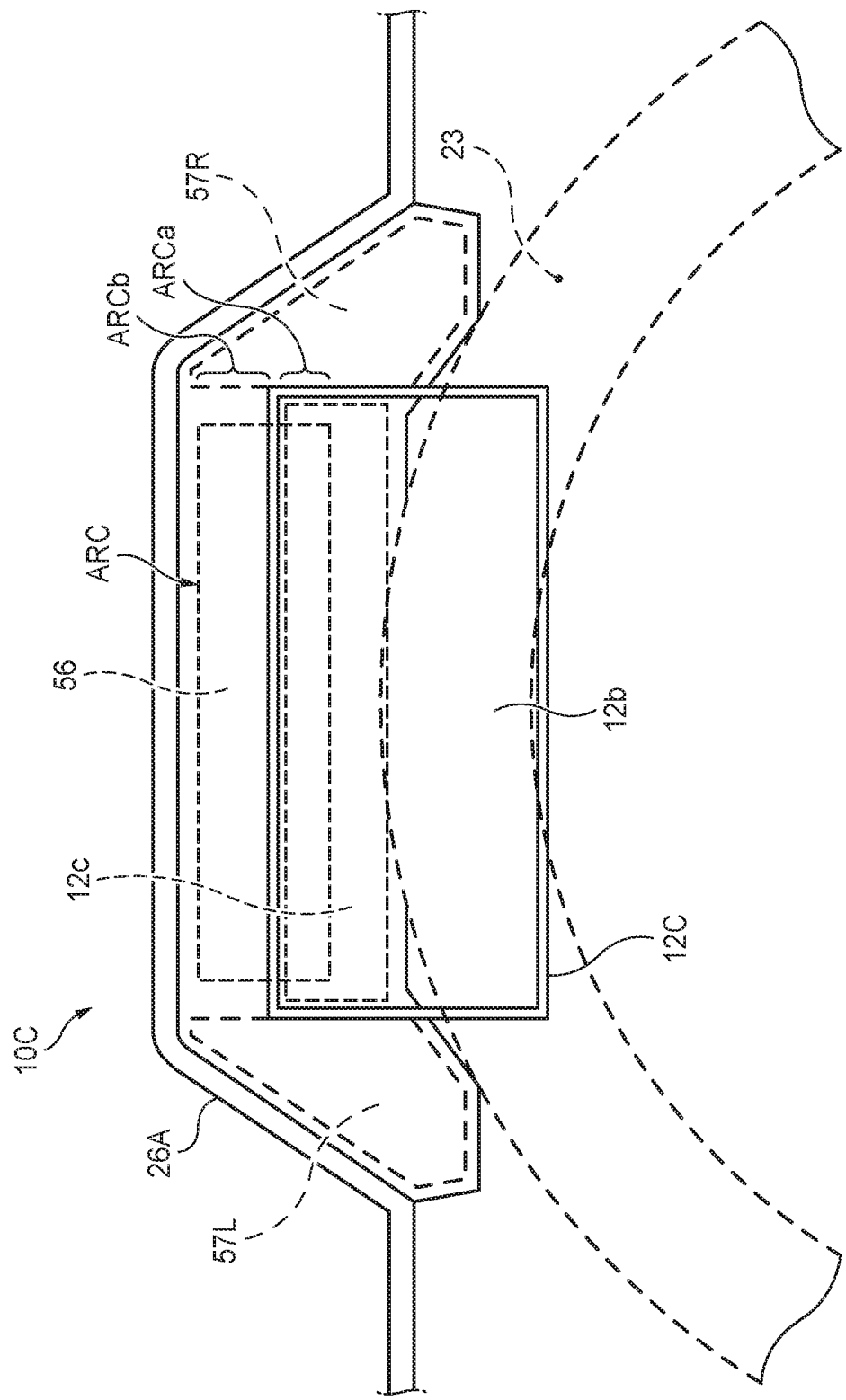
FIG. 12 is a front view illustrating an example of a state where the on-vehicle display apparatus of FIG. 11 is viewed from the driver's viewpoint side.
Figure 13:
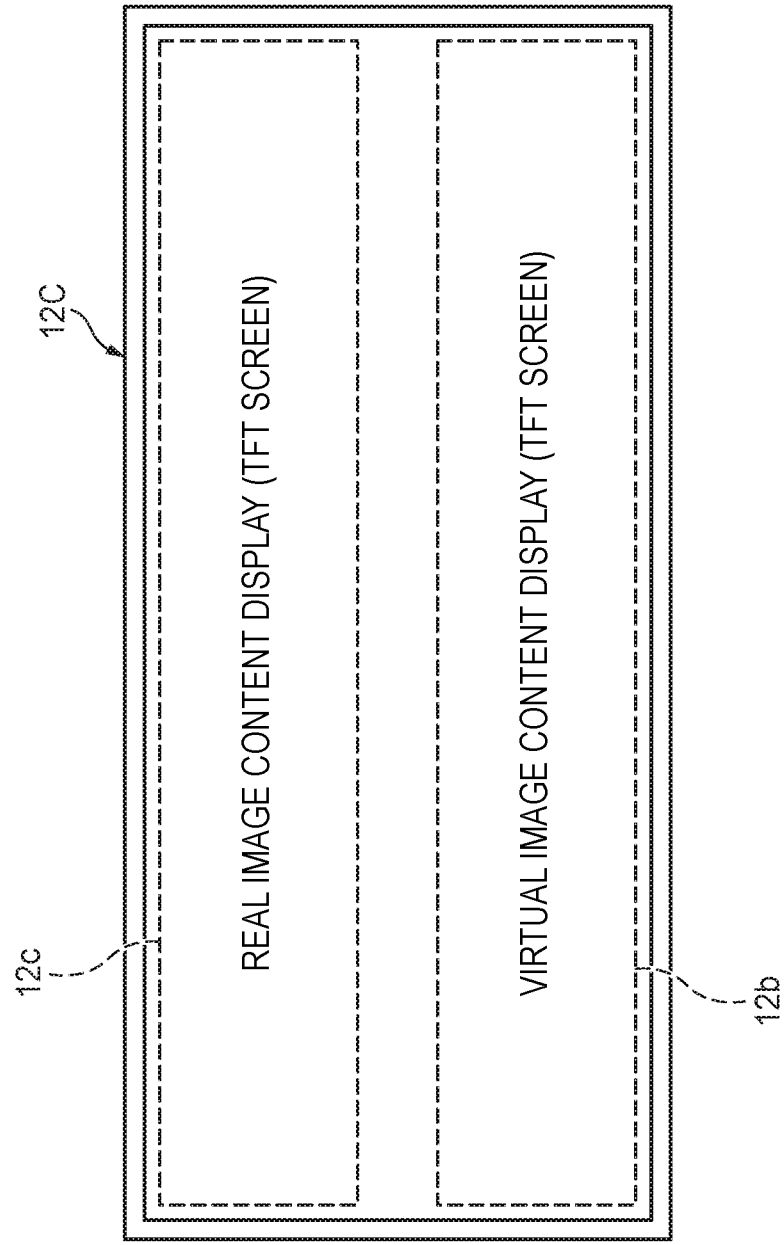
FIG. 13 is a front view illustrating an example of a screen display layout in the on-vehicle display apparatus of FIG. 11.

FIG. 12 illustrates a state where the on-vehicle display apparatus 10C of FIG. 11 is viewed from the viewpoint EP side, and FIG. 13 illustrates an example of the screen display layout in the display device 12C of the on-vehicle display apparatus 10C.

As illustrated in FIG. 13, the virtual image content is displayed in the lower display region 12b of the display device 12C, and the real image content is displayed in the real image display region 12c. When viewed from the position of the viewpoint EP by the driver, the lower display region 12b is behind the steering wheel 23, and thus, the lower display region 12b is invisible.

As illustrated in FIG. 12, the half mirror 56 is located slightly higher than the display device 12C. The virtual image projection region ARC of the half mirror 56 is configured with an overlapping region ARCa located at a position of overlapping the real image display region 12c and an extended region ARCb above the overlapping region ARCa. With respect to the overlapping region ARCa, the driver can visually recognize the content of the virtual image projected on the half mirror 56 and the content of the real image displayed on the real image display region 12c of the display device 12C in an overlapped state. In the extended region ARCb, only the content of the virtual image projected on the half mirror 56 is in a conspicuous state.

For example, in the case of the layout illustrated in FIG. 5, since the real image content and the virtual image content are displayed to be overlapped only within the range of the upper display region 12a which is restricted in the screen size of the display device 12, a large-sized virtual image cannot be displayed. On the other hand, in the case of the on-vehicle display apparatus 10C of FIG. 11, since the extended region ARCb on the upper side of the display device 12C can also be used for displaying the virtual image as illustrated in FIG. 12, it is possible to secure the display region, as a whole, having a larger screen height than that of the display device 12C. It is also possible to display a large-sized virtual image by using the extended region ARCb. Even with respect to the meter contents, such as a speedometer, which are to be displayed at all times, it is possible to display the meter contents in a state of being easy to be visually recognized by using a large virtual image.

Since the overlapping of the real image and the virtual image does not occur in the extended region ARCb, it is possible to display a virtual image with better visibility. As illustrated in FIG. 12, the real image display region 12c for displaying the real image is on the lower side, the extended region ARCb is on the upper side of the real image display region 12c, and there is also the overlapping region ARCa on which both are overlapped, so that it is possible to perform display with a better sense of depth by using the combination of the display of the real image content with the display of the virtual image content.

With respect to the inside (the facing portion) of the meter hood 26A of the place where the virtual image can be viewed from the driver's viewpoint EP, it is possible to expect the effect of improving the visibility by performing coloring such as painting with a single color such as black. In the example of FIG. 12, there are tell tale display units 57L and 57R on the left and right sides of the display device 12C. The tell tale display units 57L and 57R can be used to display various warning lights and the like as needed by using the LED indicator.

As described above, in the on-vehicle display apparatus 10C according to Modified Example illustrated in FIG. 11, since the extended region ARCb above the display device 12C can also be used for displaying the virtual image, it has the advantage that the display region as a whole having a larger size than the screen height of the display device 12C is secured, but it is also possible to obtain further improvements as described below.

Figure 14:
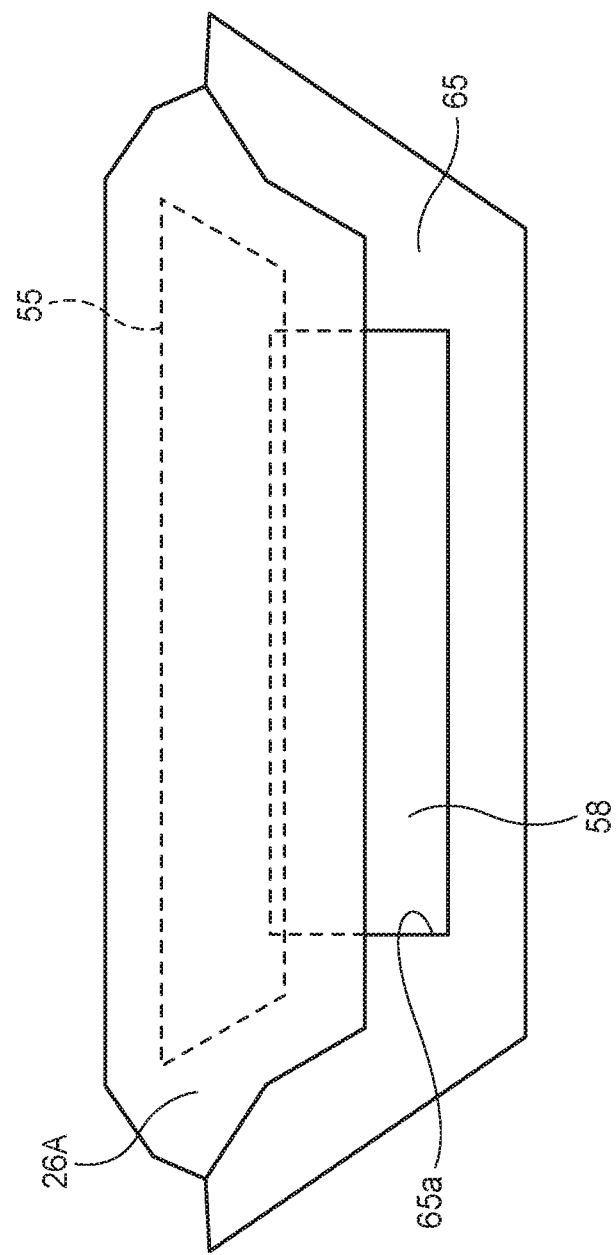
FIG. 14 is a top view of an on-vehicle display apparatus according to Modified Example and surroundings of the on-vehicle display apparatus as viewed from above the vehicle.
Figure 15:
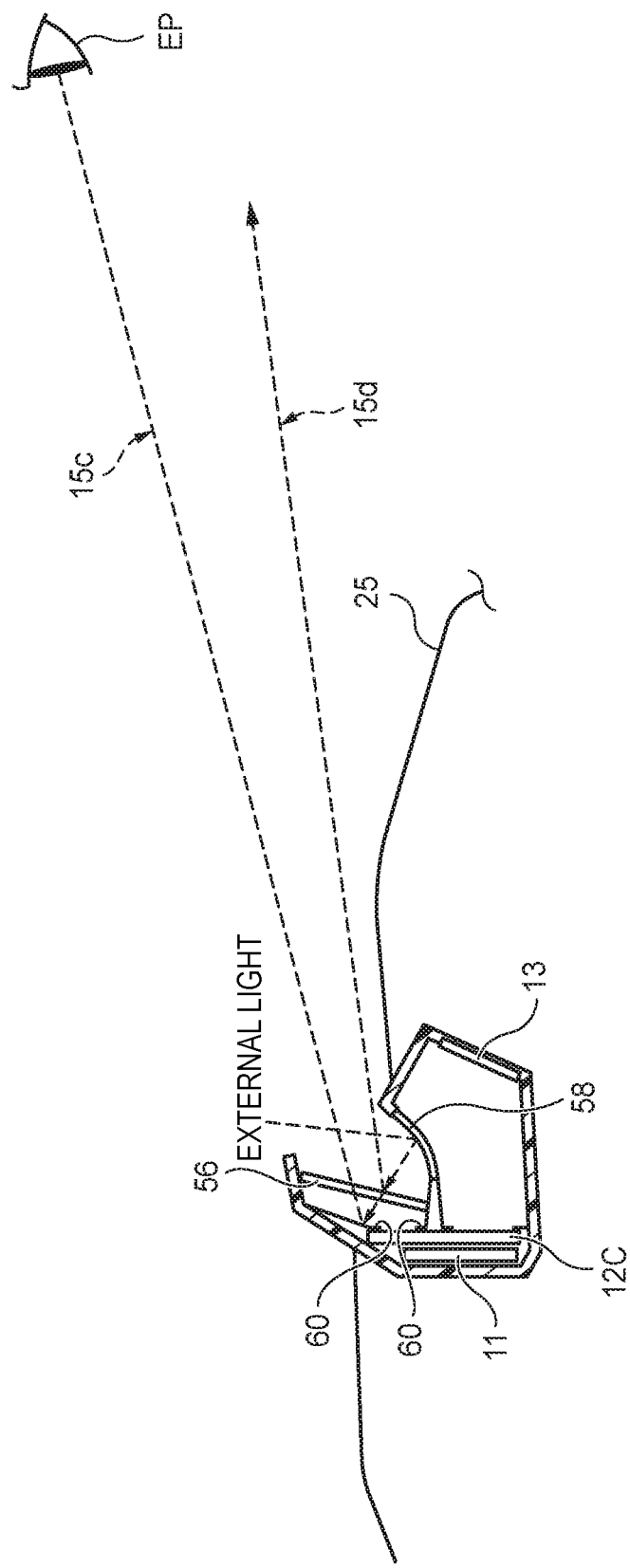
FIG. 15 is a longitudinal cross-sectional view illustrating a state where the on-vehicle display apparatus according to Modified Example is viewed from the side of the vehicle.
Figure 16A:
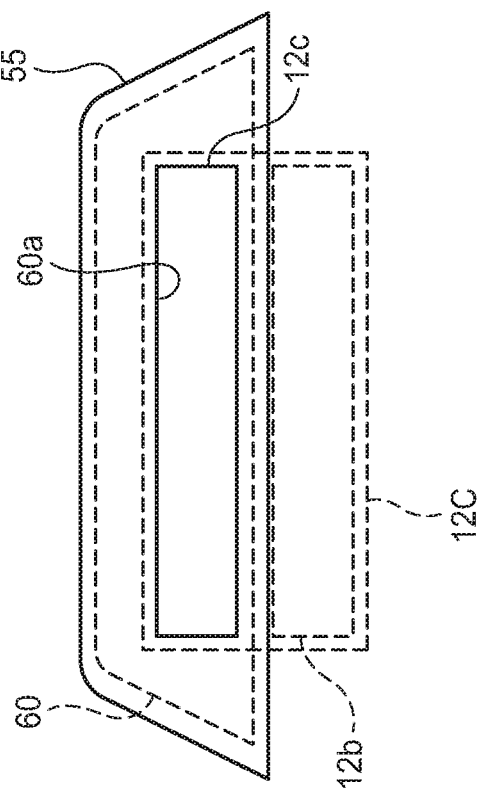
FIG. 16A is a front view of the display device in a state where a mask is installed as viewed from the driver's viewpoint side.
Figure 16B:
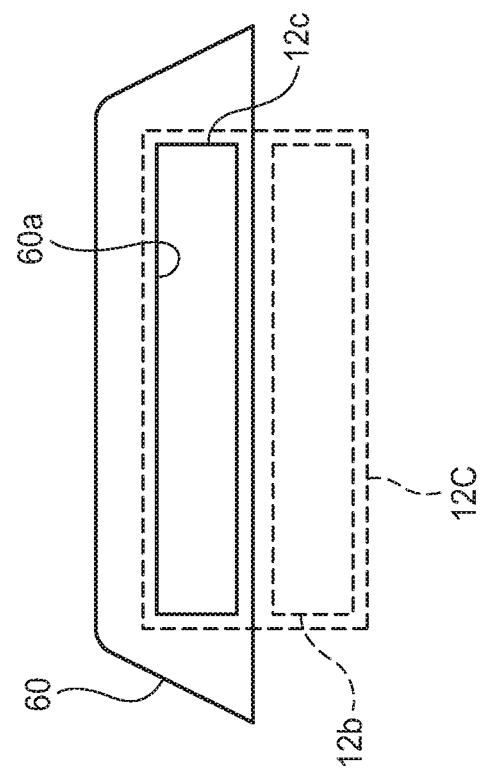
FIG. 16B is a front view of the display device in a state where a combiner is further installed as viewed from the driver's viewpoint side.

FIG. 14 is a top view of the on-vehicle display apparatus 10C and surroundings of the on-vehicle display apparatus 10C according to Modified Example illustrated in FIG. 11 when viewed from above the vehicle. FIG. 15 is a longitudinal cross-sectional view illustrating a state where the on-vehicle display apparatus 10C is viewed from the side of the vehicle. FIG. 16A is a front view of the display device 12C in a state where a mask 60 is installed as viewed from the driver's viewpoint side, and FIG. 16B is a front view of the display device 12C in a state where the combiner 55 is further installed as viewed from the driver's viewpoint side.

The on-vehicle display apparatus 10C is installed in the instrument panel portion 65 and is covered with the meter hood 26A together with the combiner 55. The instrument panel portion 65 is formed with an opening 65a for projecting the light reflected by the surface of the reflecting member 13 toward the surface of the half mirror 56. The glare trap lens 58 is installed in the opening 65a. Since the on-vehicle display apparatus 10C according to Modified Example has the extended region ARCb, the mask 60 having a size larger than that of the related art is used.

As illustrated in FIG. 14, the glare trap lens 58 has a region that is not covered by the meter hood 26A when viewed from above the vehicle. Although the external light is not directly incident on the display device 12C, as illustrated in FIG. 15, the external light may be incident on the glare trap lens 58, a portion of the incident light may be reflected by the glare trap lens 58, and the mask 60 may be irradiated with the light transmitted through the combiner 55. Since the mask 60 is formed with a mask opening 60a for allowing the driver to visually recognize the real image display region 12c, when the mask 60 is irradiated with the external light, the mask opening 60a becomes conspicuous, and thus, the appearance is degraded, and this causes a decrease in the sense of integration between the virtual image content and the real image content. A portion of the incident light is transmitted through the glare trap lens 58 and enters the inside of the on-vehicle display apparatus 10C, so that the contrast of the virtual image content is decreased. In the on-vehicle display apparatus 10C according to Modified Example, the combiner 55 and the glare trap lens 58 may be further configured with a dimming member.

Figure 17:
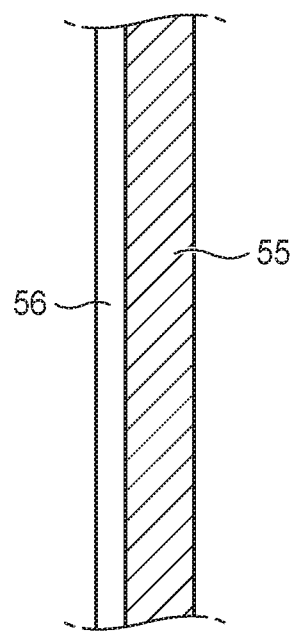
FIG. 17 is a longitudinal cross-sectional view illustrating a configuration example of the combiner.

FIG. 17 is a longitudinal cross-sectional view illustrating a configuration example of the combiner 55. The main body of the combiner 55 is configured with a dimming member, and the half mirror 56 is stacked on one surface of the main body. By arranging the combiner 55 as illustrated in FIG. 16B, since the external light passing through the combiner 55 is attenuated and the external light with which the entire surface of the mask 60 is irradiated is reduced, the mask opening 60a is less likely to be visually recognized by the driver, and thus, the integration between the virtual image content and the real image content is enhanced.

Figure 18:
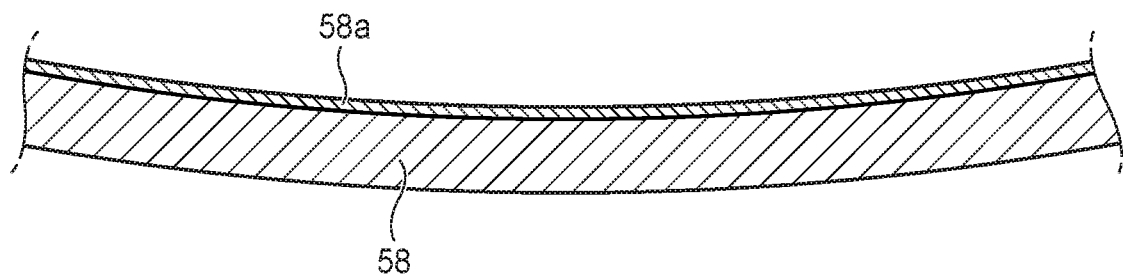
FIG. 18 is a longitudinal cross-sectional view illustrating a configuration example of a glare trap lens.

FIG. 18 is a longitudinal cross-sectional view illustrating a configuration example of the glare trap lens 58. In the on-vehicle display apparatus 10C, the glare trap lens 58 is configured with a dimming member having a reduced light transmittance, and antireflection coating 58a is applied to the upper surface of the vehicle. Accordingly, the light that is transmitted through the glare trap lens 58 and enters the inside of the on-vehicle display apparatus 10C is reduced, and thus, the contrast of the virtual image content can be further improved. In a case where the glare trap lens 58 to which the antireflection coating 58a is applied is used, it is possible to further suppress the external light which is reflected by the glare trap lens 58 and passes through the combiner 55 and with which the mask 60 is irradiated.

The reflecting member 13 of the on-vehicle display apparatus 10C may be a flat plate-shaped mirror or may be a magnifying glass. When the reflecting member 13 is used as a magnifying glass, it is possible to project the virtual image with a size larger than that of the lower display region 12b, and it is possible to more effectively use the extended region ARCb.

Figure 19:
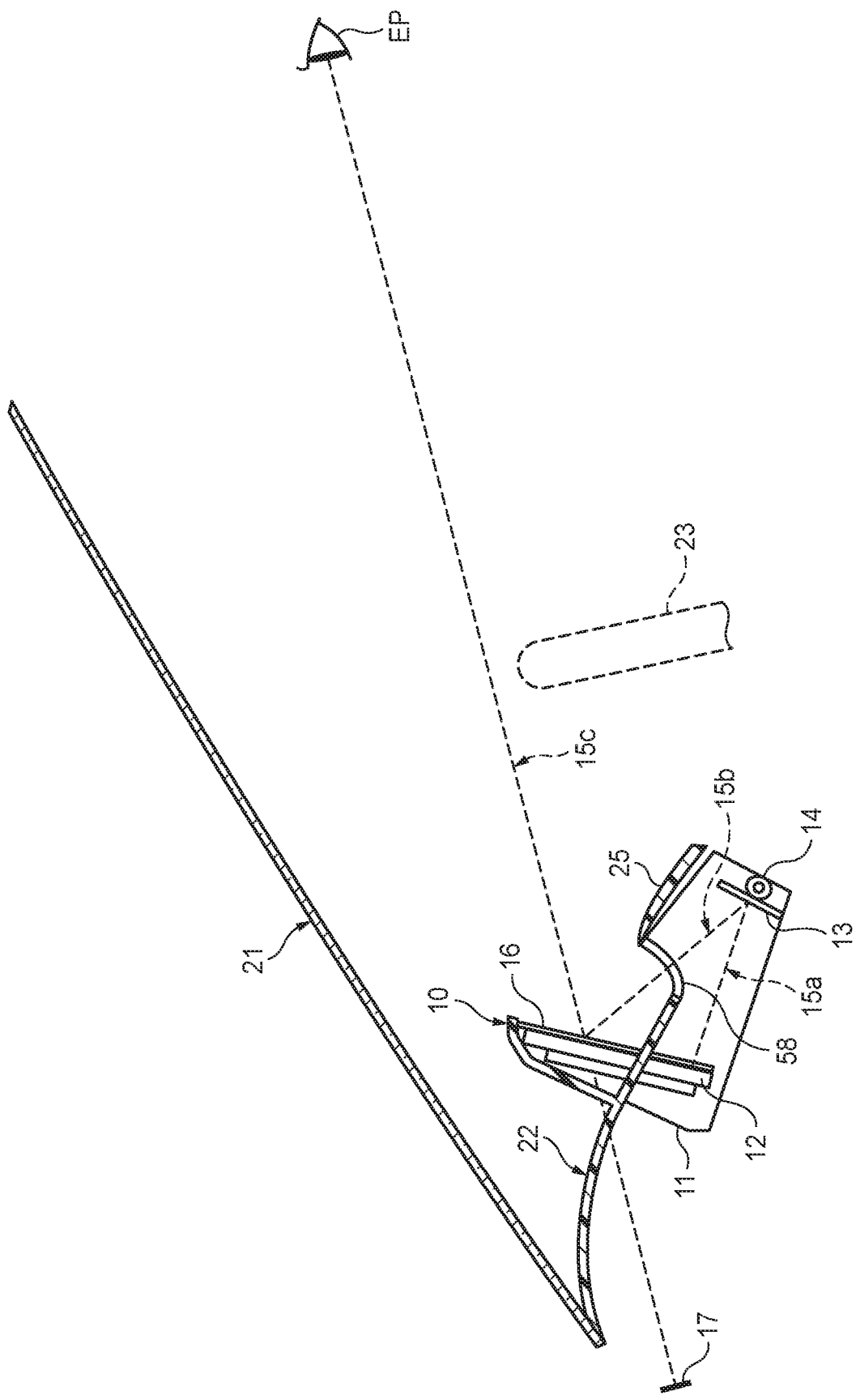
FIG. 19 is a longitudinal cross-sectional view illustrating a state where an on-vehicle display apparatus of Modified Example 3 is viewed from the side of the vehicle.

The glare trap lens 58 may be applied to any of the above-described on-vehicle display apparatuses. FIG. 19 illustrates Modified Example 3 in which the glare trap lens 58 is installed in the on-vehicle display apparatus 10 illustrated in the configuration example 1.

In this way, in a case where the on-vehicle display apparatus is provided with the glare trap lens 58, it is possible to prevent the external light from being directly incident on the reflecting member or the display device without being attenuated, and it is also possible to prevent dust and the like from entering the housing of the on-vehicle display apparatus. For example, when the external light is reflected by the combiner 55 and the glare trap lens 58, by reflecting the external light by the glare trap lens 58 inside the meter hood which cannot be visually recognized by the driver, it is also possible to prevent the external light from entering the driver's field of view.

The on-vehicle display apparatus (10) that can be arranged at a position that can be visually recognized from the driver's viewpoint (EP) position of the embodiment includes:
 a display (display device 12) having a display surface capable of displaying desired visible information as a real image;
 a first display region (upper display region 12a) formed on a portion of the display surface of the display;
 a second display region (lower display region 12b) formed at a portion of the display surface of the display and at a position different from that of the first display region; and
 a virtual image overlapping mechanism (reflecting member 13) having a reflecting surface (reflecting member 13) that reflects a light image displayed as a real image (19) in the second display region and projecting the light image reflected by the reflecting surface as a virtual image (17) in a state where a position of the virtual image (17) overlaps a position of the real image (18) displayed in the first display region when viewed from the viewpoint position.

With the on-vehicle display apparatus having the above-described configuration, it is possible to simultaneously display the real image and the virtual image in a state of being overlapped by using the first display region. Since the virtual image is reflected and projected, an optical path length is longer than that of the real image. That is, since the focal length of the virtual image is farther than that of the real image, even when the installation position of the on-vehicle display apparatus is close to the driver, the driver can visually recognize the virtual image with only a slight focus adjustment, and the visibility is improved. Since the virtual image is formed based on the real image of the second display region, it is possible to effectively utilize the entire display surface of the display. Since both the real image and the virtual image can be formed with only a single display, it is easy to reduce the cost of parts and to reduce the space required for the installation.

The second display region is allocated to a blind spot position in a state of being hidden behind the steering wheel (23) of the own vehicle when the display surface is viewed from the viewpoint position.

The first display region may be allocated to a position that can be visually recognized without being affected by the steering wheel when the display surface is viewed from the viewpoint position.

With the on-vehicle display apparatus having the above-described configuration, a place that becomes a blind spot caused by the existence of the steering wheel arranged between the driver and the on-vehicle display apparatus can also be effectively used as a space for the display. That is, instead of the real image displayed in the second display region, since the driver can visually recognize the virtual image in the first display region, it is not necessary to visually recognize the real image in the second display region, but the real image displayed in the second display region can also be effectively used to form a virtual image.

The virtual image overlapping mechanism may include a movable mechanism (stepping motor 14) that adjusts the orientation of the reflecting surface to adjust the projection position of the virtual image.

With the on-vehicle display apparatus having the above-described configuration, even in a case where the display position of the virtual image is shifted due to the difference in the position and posture of the seat on which the driver sits or the difference in the body shape and posture of the driver himself/herself, the display position can be easily matched with the first display region.

The display surface may have a light reflecting member (cover glass 33) made of a transparent material.

With the on-vehicle display apparatus having the above-described configuration, even when the light reflection characteristic on the display surface is not sufficient, it becomes easy to form the virtual image having sufficient brightness for visual recognition due to the optical characteristic of the light reflecting member.

The display may have a backlight (32) that illuminates the entire regions of the first display region and the second display region from the back side.

With the on-vehicle display apparatus having the above-described configuration, it is possible to form the real image of the first display region and the second display region and the virtual image of the first display region by only the illumination of one backlight. The number of required parts can be reduced, and thus, it is easy to reduce the cost of parts and to reduce the space required for the installation.

A light reflecting member (half mirror 56) that reflects the light image from the virtual image overlapping mechanism in the direction of the viewpoint position and transmits the real image may be installed at a position separated from the display toward the viewpoint (EP) position side.

The light reflecting member may have a height in which a projection range of the projected virtual image includes an overlapping region (overlapping region ARCa) overlapping the first display region and an extended region (extended region ARCb) located above the first display region.

With the on-vehicle display apparatus having the above-described configuration, since the virtual image can be projected by using the extended region, it is possible to use a wider range than the screen height of the display as the display region. As a result, it is possible to display the content to be displayed as the virtual image in a state of being easily visually recognized. Since the virtual image can be displayed on the upper side and the real image can be displayed on the lower side and the virtual image and the real image can be partially overlapped, it is possible to perform display with a better sense of depth.

The light reflecting member (half mirror 56) may be arranged at a position that does not cover the optical path from the second display region to the virtual image overlapping mechanism.

With the on-vehicle display apparatus having the above-described configuration, since a portion of the real image displayed in the second display region can be visually recognized as the virtual image by the driver without being attenuated by passing through the light reflecting member, it is possible for the driver to clearly visually recognize the virtual image.

With the on-vehicle display apparatus of the embodiment, since the virtual image having a long focal length can be used, it is possible to easily adjust the focus with the driver's eyes and to implement the display with good visibility. It is also possible to avoid complication of the shape and the structure and to effectively utilize the entire display region.

What is claimed is:

1. An on-vehicle display apparatus that can be arranged in a position that can be visually recognized from a driver's viewpoint position, the on-vehicle display apparatus comprising:
   a display having a display surface capable of displaying desired visible information as a real image;
   a first display region formed on a portion of the display surface of the display;
   a second display region formed at a portion of the display surface of the display and at a position different from that of the first display region; and
   a virtual image overlapping mechanism having a reflecting surface that reflects a light image displayed as a real image in the second display region and projecting the light image reflected by the reflecting surface as a virtual image in a state where a position of the virtual image overlaps a position of the real image displayed in the first display region when viewed from the viewpoint position wherein
   the second display region is allocated to a blind spot position in a state of being hidden behind a steering wheel of an own vehicle when the display surface is viewed from the viewpoint position, and
   the first display region is allocated to a position that can be visually recognized without being affected by the steering wheel when the display surface is viewed from the viewpoint position.

2. The on-vehicle display apparatus according to claim 1, wherein
   the virtual image overlapping mechanism has a movable mechanism that adjusts an orientation of the reflecting surface to adjust a projection position of the virtual image.

3. The on-vehicle display apparatus according to claim 1, wherein
   the display surface has a light reflecting member made of a transparent material.

4. The on-vehicle display apparatus according to claim 1, wherein
   the display has a backlight that illuminates the entire regions of the first display region and the second display region from the back side.

5. The on-vehicle display apparatus according to claim 1, wherein
   a light reflecting member that reflects the light image from the virtual image overlapping mechanism in a direction of the viewpoint position and transmits the real image is installed at a position separated from the display toward the viewpoint position side, and
   the light reflecting member has a height in which a projection range of the projected virtual image includes an overlapping region overlapping the first display region and an extended region located above the first display region.

6. The on-vehicle display apparatus according to claim 5, wherein
   the light reflecting member is arranged at a position that does not cover an optical path from the second display region to the virtual image overlapping mechanism.

* * * * *